United States Patent
Ji

(10) Patent No.: US 8,442,478 B2
(45) Date of Patent: May 14, 2013

(54) METHOD AND APPARATUS FOR CONTROLLING VOICE CALL QUALITY IN PORTABLE TERMINAL

(75) Inventor: Yong Kyu Ji, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 397 days.

(21) Appl. No.: 12/460,632

(22) Filed: Jul. 22, 2009

(65) Prior Publication Data
US 2010/0022236 A1    Jan. 28, 2010

(30) Foreign Application Priority Data
Jul. 24, 2008  (KR) .................. 10-2008-0072171

(51) Int. Cl.
*H04B 1/06*  (2006.01)
(52) U.S. Cl.
USPC ..... 455/355; 455/418; 455/177.1; 455/200.1; 455/219; 379/388.02

(58) Field of Classification Search .......... 455/418–420, 455/177.1, 200.1, 219, 355; 379/388.02–388.06
See application file for complete search history.

(56) References Cited

U.S. PATENT DOCUMENTS

| 2005/0026568 | A1* | 2/2005 | Hawker et al. ................. 455/70 |
| 2005/0254639 | A1* | 11/2005 | Rodriguez et al. ....... 379/388.04 |
| 2006/0111094 | A1* | 5/2006 | Lee .............................. 455/418 |

FOREIGN PATENT DOCUMENTS
KR  1020060057052 A  5/2006

* cited by examiner

*Primary Examiner* — Vladimir Magloire

(57) ABSTRACT

A method and apparatus is disclosed that controls voice call quality by networks and maintains the optimal voice call quality in a portable terminal. The voice call quality control method includes: identifying a network, connected to the portable terminal when the portable terminal enters a voice call mode, and a value for applying voice call quality of the network; changing a value for setting voice call quality, performed in the network, by the value for applying voice call quality; and controlling voice call quality of a voice call mode in the network by the altered value for setting voice call quality.

20 Claims, 3 Drawing Sheets

METHOD AND APPARATUS FOR CONTROLLING VOICE CALL QUALITY IN PORTABLE TERMINAL

CROSS-REFERENCE TO RELATED APPLICATION(S) AND CLAIM OF PRIORITY

The present application claims priority to an application entitled "METHOD AND APPARATUS FOR CONTROLLING VOICE CALL QUALITY TN PORTABLE TERMINAL" filed in the Korean Intellectual Property Office on Jul. 24, 2008 and assigned Serial No. 10-2008-0072171, the contents of which are incorporated herein by reference.

TECHNICAL FIELD OF THE INVENTION

The present invention relates to portable terminals, and more particularly, to a method and apparatus that can adaptively control voice call quality in a portable terminal to comply with a network, according to information regarding voice call quality applied to the network, when the portable terminal makes a call.

BACKGROUND OF THE INVENTION

A portable terminal can make a call using a variety of media (hereinafter called 'call media'), such as a microphone installed thereto, a microphone connected to earphones, a microphone connected to a Bluetooth® headset, and the like. For example, a portable terminal transmits a user's voice signal to the other portable terminal and also receives the other user's voice signal via the media, such as a receiver, earphones, a loud speaker, a Bluetooth® headset, and the like, There from. When the portable terminal communicates with the other portable terminal, voice call quality is a very important factor.

Portable terminals communicate through a variety of communication methods, such as RF communication, wired communication, Internet Protocol (IP) communication, and the like.

A portable terminal, which can support a dual mode/dual standby mode or more modes, uses a SIM card of at least one network (service provider). For example, a single portable terminal can be operated through a plurality of networks (service providers).

When portable terminals make a call, their voice call qualities differ according to a variety of call media, communication methods, and networks (service providers).

Conventional portable terminals fix their values for setting voice call quality, such as voice quality, volume, and the like, to a default value. For example, the terminals cannot adaptively change their values according to a variety of call media, communication methods, and networks (service providers). Therefore, they cannot provide optimal voice call quality according to a variety of call media, communication methods, and networks (service providers).

SUMMARY OF THE INVENTION

To address the above-discussed deficiencies of the prior art, it is a primary object to provide a method and apparatus that can adaptively change a value for setting voice call quality in a portable terminal, according to a call environment, and accordingly can provide optimal voice call quality.

The present invention further provides a method and apparatus that can change a value for setting voice call quality in a portable terminal, according to call medium for a voice call, can apply it to the call medium, and accordingly can provide optimal voice call quality when the portable terminal makes a call.

The present invention further provides a method and apparatus that can change a value for setting voice call quality in a portable terminal, according to a call connection manner for a voice call, apply it to the manner, and accordingly can provide optimal voice call quality when the portable terminal makes a call.

The present invention further provides a method and apparatus that can change a value for setting voice call quality in a portable terminal, by networks (service providers) used for a voice call, can apply it to the corresponding network, and accordingly can provide optimal voice call quality when the portable terminal makes a call.

In accordance with an exemplary embodiment of the present invention, the present invention provides a method for controlling voice call quality in a portable terminal, including: identifying a network, connected to the portable terminal when the portable terminal enters a voice call mode, and a value for applying voice call quality with respect to the network; changing a value for setting voice call quality, performed in the network, by the value for applying voice call quality; and controlling voice call quality of a voice call mode in the network by the changed value for setting voice call quality.

In accordance with another exemplary embodiment of the present invention, the present invention provides a method for controlling voice call quality in a portable terminal, including: acquiring information regarding a network when the portable terminal enters a voice call mode; identifying call medium used in the voice call mode; changing a value for setting voice call quality of the call medium using a value for applying voice call quality corresponding to the information regarding a network; and providing and controlling voice call quality by a value for setting voice call quality that is changed with respect to the call medium.

In accordance with another exemplary embodiment of the present invention, the present invention provides a portable terminal including: an radio frequency (RF) communication unit for establishing a communication channel with a particular network in a preset communication method, performing voice communication and data communication, and receiving network information and information regarding voice call quality of a corresponding network (a value for applying voice call quality), via the particular network associated with the RF communication unit; a memory for storing at least one application required to perform functions of the portable terminal, voice call quality information previously applied to the portable terminal (a value for setting voice call quality), network information by at least one network and voice call quality information corresponding to the network information (a value for applying voice call quality), and voice call quality information changed when the portable terminal makes a call (a value for determining voice call quality); and a controller for acquiring information regarding a network connected to the portable terminal and the value for applying voice call quality of a corresponding network, changing the default value for setting voice call quality according to the value for applying voice call quality of the corresponding network when the portable terminal enters a voice call mode, and controlling voice call quality.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
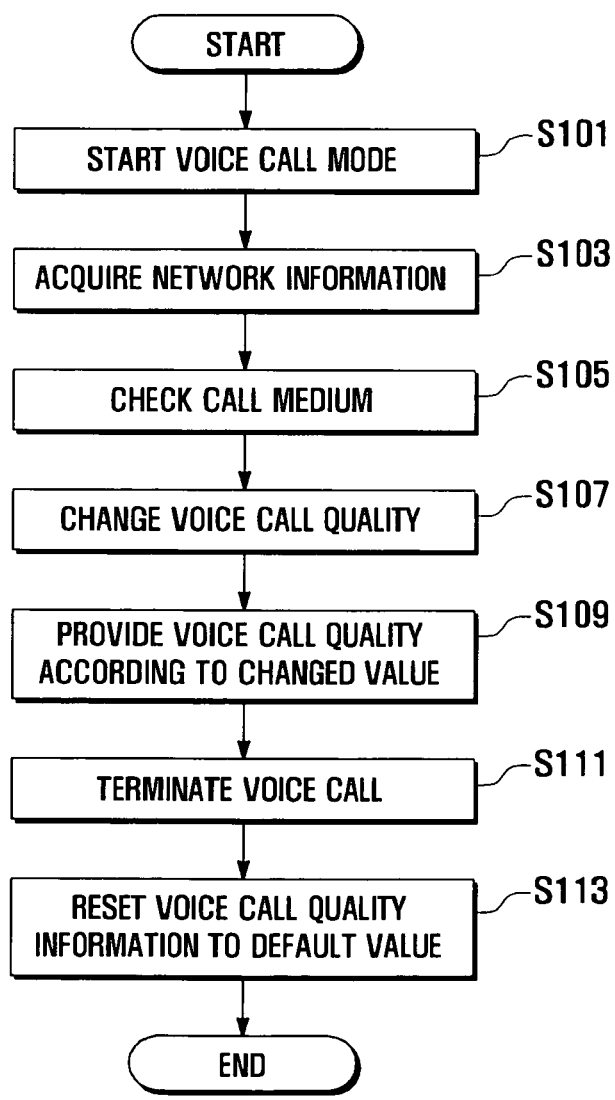
FIG. 1 illustrates a flow chart describing a method for controlling voice call quality in a portable terminal, according to an embodiment of the present invention.
Figure 2:
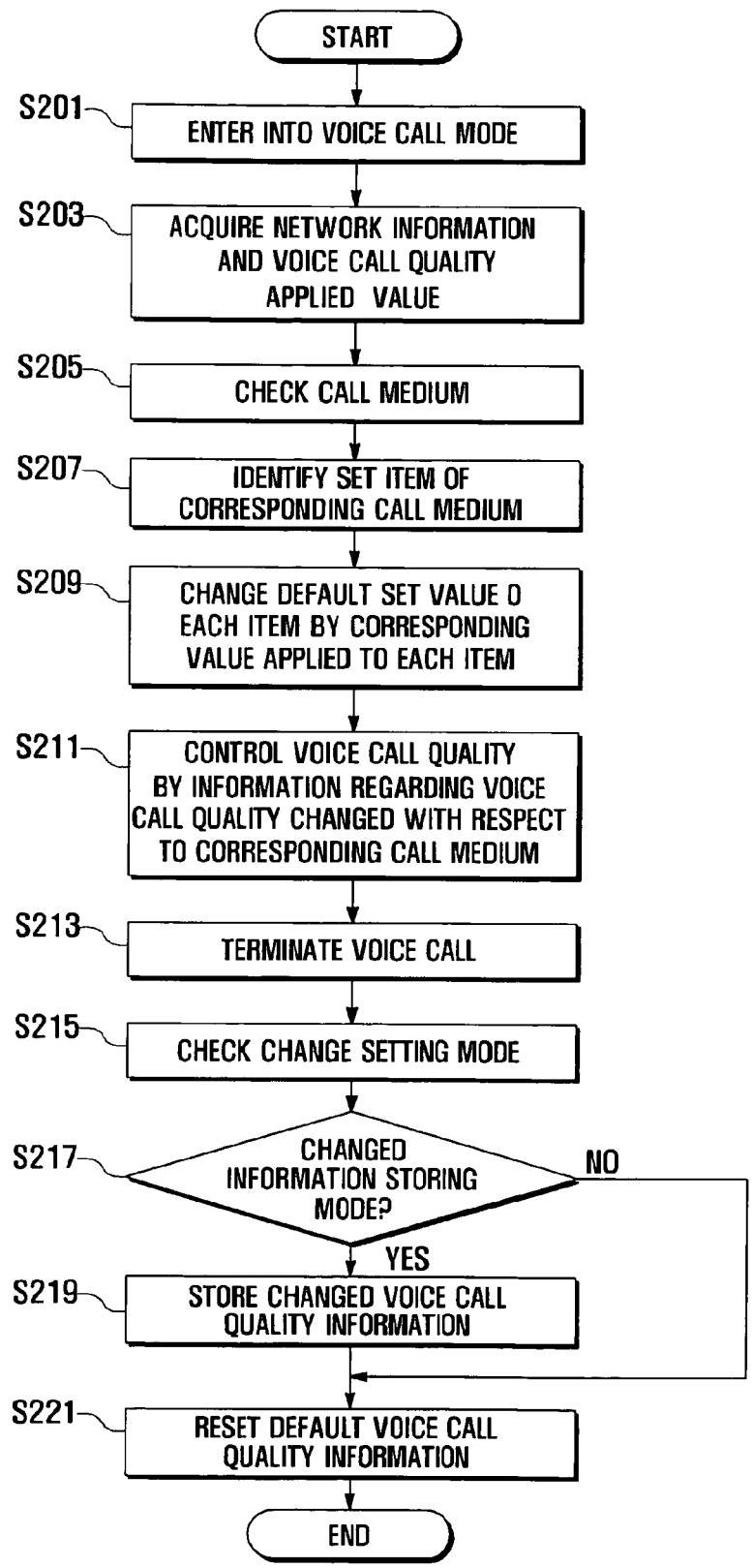
FIG. 2 illustrates a flow chart describing a method for, in detail, controlling voice call quality in a portable terminal when the voice call quality is changed and the changed voice call quality is applied according to an embodiment of the present invention.
Figure 3:
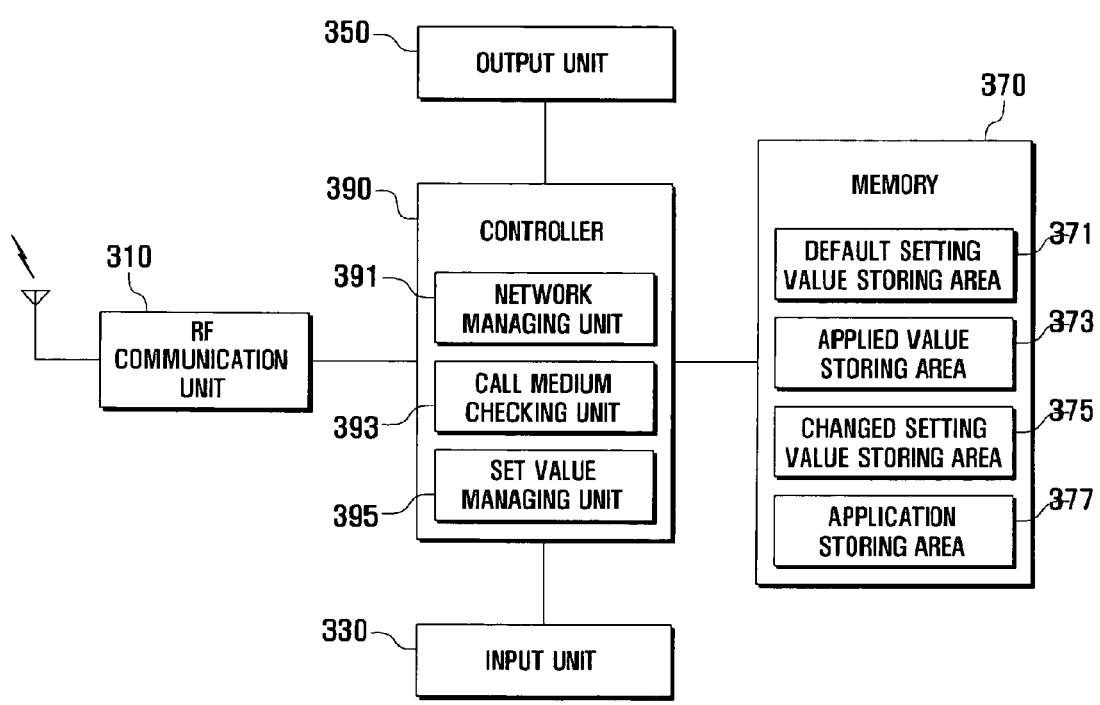
FIG. 3 illustrates a schematic block diagram for a portable terminal according to an embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The present invention relates to a method and apparatus for improving voice call quality in a portable terminal, corresponding to a variety of call environments. In particular, in an embodiment of the present invention, as a value for setting voice call quality is adaptively changed and applied to the portable terminal, corresponding to a variety of call environments, optimal voice call quality can be serviced.

The call environments are determined according to call media, communication connecting methods, networks (service providers), and the like. The call media refer to media through which a portable terminal can make a call. Examples of call media are a receiver, earphones, a loud speaker, Bluetooth® headset, and the like. The communication connecting methods refer to ways by which a portable terminal is connected to the other portable terminal to perform voice call. Examples of the communication connecting methods are RF or wired communication, Internet Protocol (IP) communication, and the like. The networks (service providers) refer to networks or service providers to which a portable terminal is connected to in order to make a call with the other portable terminal. Examples of the networks (service providers) are 2nd, 3rd, 4th generation networks, and so forth.

In an embodiment of the present invention, a value for setting voice call quality refers to a value that is initially set in a portable terminal to control the voice call quality of the portable terminal. A value for applying voice call quality refers to a value for providing optimal voice call quality by networks supported by the portable terminal. There also is a value for determining voice call quality that is a changed value for setting voice call quality that is acquired by adding a value for applying the voice call quality of a corresponding network to the value for setting voice call quality.

According to recent portable terminal technology, one portable terminal can use at least one SIM card. That is, one portable terminal can employ a SIM card of a service provider A or B to use the network of the service provider A or B. A portable terminal, which can support a dual mode/dual standby mode or more modes, uses a SIM card of at least one network (service provider). That is, a single portable terminal can be operated through a plurality of networks (service providers).

When portable terminals make a call, their voice call qualities differ according to a variety of call media, communication methods, and networks (service providers). The conventional portable terminals fix their values for setting voice call quality, such as voice quality, volume, and the like, to the default value.

The following Table 1 describe a menu for setting voice call quality, which is generally used by the portable terminal.

TABLE 1

| Depth 1 | Depth 2 | Depth 3 |
|---|---|---|
| [1] RCV Config | [1] Rx Vol | [1] Call Vol |
|  |  | [2] DTMF Vol |
|  | [2] Codec |  |
|  | [3] NS-EC | [1] EC Mode |
|  |  | [2] EC Params |
|  |  | [3] NS On/Off |
|  | [4] Tx Filter |  |
|  | [5] Rx Filter |  |
|  | [6] Tx AGC |  |
|  | [7] Rx AGC |  |
| [2] EAR Config | [1] Rx Vol | [1] Call Vol |
|  |  | [2] DTMF Vol |
|  |  | [3] MP3 File Vol |
|  |  | [4] AMR File Vol |
|  |  | [5] MIDI File Vol |
|  | [2] Codec |  |
|  | [3] NS-EC | [1] NS On/Off |
|  |  | [2] EC Mode |
|  |  | [3] EC Params |
|  | [4] Tx Filter |  |
|  | [5] Rx Filter |  |
|  | [6] TX AGC |  |
|  | [7] RX AGC |  |
|  | [8] AMR Codec |  |
|  | [9] Load FIR Filter | [1] Total Data Length |
|  |  | [2] Line Count |
| [3] SPK Config | [1] Rx Vol | [1] Call Vol |
|  |  | [2] DTMF Vol |
|  |  | [3] MP3 File Vol |
|  |  | [4] AMR File Vol |
|  |  | [5] MIDI File Vol |
|  |  | [6] FIR Filter view |
|  | [2] Codec |  |
|  |  | [2] EC Params |
|  |  | [3] NS On/Off |
|  | [4] Tx Filter |  |
|  | [5] Rx Filter |  |
|  | [6] Tx AGC |  |
|  | [7] Rx AGC |  |
|  | [8] 2G-Loud & 3G-VT |  |
|  | [9] AMR Codec |  |

TABLE 1-continued

| Depth 1 | Depth 2 | Depth 3 |
|---|---|---|
| [4] BTH Config (Bluetooth®) | [1] Rx Vol | [1] Call Vol |
| | | [2] DTMF Vol |
| | [2] Codec | |
| | [3] EC-NS | [1] EC Mode |
| | | [2] EC Params |
| | | [3] NS On/Off |
| | [4] Tx Filter | |
| | [5] Rx Filter | |
| | [6] TX AGC | |
| | [7] RX AGC | |

The menu for setting voice call quality using a receiver as one of the call media, described in Table 1, is shown in detail in the following Table 2. It should be understood that the other call media, such as earphones, a speaker, a Bluetooth® headset, and the like, can also be set according to the method used in Table 2.

TABLE 2

| Depth 1 | Depth 2 | Depth 3 | Comment |
|---|---|---|---|
| [1] RCV Config | [1] Rx Vol | [1] Call Vol | RCV: Rx volume setting |
| | | [2] DTMF Vol | RCV: DTMF volume setting |

In Tables 1 and 2, the first item in Depth 1, '[1] RCV Config,' refers to receiver configuration to set voice call quality using a receiver. '[1] Rx Vol' of the receiver configuration 'RCV Config' in Depth 2 is a submenu related to a reception volume during the call. '[1] Call Vol' of the submenu '[1] Rx Vol', in Depth 3, refers to a value for setting volume during the call. A tuned value is recorded into an item 'Comment.' Similarly, with respect to from '[2] Codec' to '[7] RX AGC' of the receiver configuration 'RCV Config' in Depth 2, a determined value is set and then applied to the portable terminal during the call.

Similar to the description regarding the receiver configuration, the earphone configuration EAR Config, speaker configuration SPK Config and Bluetooth® configuration BTH Config can also be set with respect to the respective items and then applied to the portable terminal during the call.

As described above, each portable terminal has call characteristics, i.e., values for setting a predetermined voice call quality in a table. For example, when a single tuned value is applied to the portable terminal, a characteristic corresponding to only the value is shown.

Portable terminals, however, have call characteristics that differ with respect to a variety of networks. For example, the noise characteristics, such as transmitting and receiving gains, white noise, echo, and the like, differ between service providers A and B. Therefore, if conventional portable terminals have optimal call characteristics corresponding to service providers, the terminals download binaries to meet respective networks each time the terminals communicate with other networks. This is, however, impossible.

Although a portable terminal uses the same network, if the other terminal is a wired terminal or an IP-based terminal, the characteristics of the portable terminal (RX caller) may be changed. For example, in general, the portable terminal user may experience more white noise when the portable terminal user makes a call with an IP-based terminal than when the portable terminal user makes a call with a wired terminal user. Therefore, conventional technology is not able to distinguish whether the other terminal is a wired terminal or an IP-based terminal, but instead only allows the portable terminal to make a call with the other terminal using a determined tuned value.

As described above, in conventional portable terminals, users experience alterations in voice call quality according to networks and the users' situation, so that users may feel that their portable terminals have malfunctioned or that the performance of the portable terminals has deteriorated. That is, conventional portable terminals have a single predetermined value for voice call quality irrespective of call media, communication connecting methods, and networks. Therefore, conventional portable terminals cannot adaptively change the value for setting voice call quality according to a variety of call media, communication connecting methods, and networks (service providers), and thus, cannot provide optimal voice call quality.

In order to resolve the problems, an embodiment of the present invention is implemented in such a way that a value for setting voice call quality can be adaptively changed according to call environments, such as call media, communication connecting methods, and types of networks, while the portable terminal is making a call, and can be applied to the portable terminal, thereby providing and maintaining optimal voice call quality. In particular, the method and apparatus of the present invention can be useful to portable terminals that employ a dual SIM card.

In an embodiment of the present invention, when a portable terminal is booted or starts a voice call, it receives a network detecting signal from a currently connected network and recognizes information regarding the network. The portable terminal can also recognize information regarding a network, through which it currently attempts to make a call, through network information that was registered in at least one SIM card that is installed thereto. Such network recognition may be implemented with a variety of methods that are directly related to the present invention, and as such a detailed description will be omitted in the present application.

If one of the networks is determined through the network recognizing process described above, the portable terminal determines a value for setting voice call quality through a database related to a call that is performed via the determined network. For example, the portable terminal acquires values for applying voice call quality, such as Set_A_REV_Rx_Call_Parameter, Set_A_Ear_RxAGC_eThres_Parameter, and the like, from a database and determines a value for setting voice call quality with respect to a corresponding network.

The following Table 3 shows an example of the database having values for applying voice call quality for changing a value for setting voice call quality with respect to respective networks.

TABLE 3

| Network | Value |
|---|---|
| A Network | A_RCV_Rx_Call_Det = −4 |
| | A_Ear_RxAGC_eThres_det = 1536 |
| | A_Ear_RxAGC_eslope_det = −16 |
| | A_BTH_RxAGC_eThres_det = 768 |
| | A_BTH_RxAGC_eslope_det = −26 |
| | . . . |
| | . . . |
| B Network | . . . |
| . . . | . . . |

When the values for applying voice call quality with respect to a corresponding network have been acquired as described above, the portable terminal applies the values for applying voice call quality to a value for setting voice call quality that was initially set therein, and calculates a value for controlling voice call quality that is intended to be applied when it actually makes a call. This operation is explained with reference to following Table 4.

TABLE 4

| Depth 1 | Depth 2 | Depth 3 | Depth 4 |
|---|---|---|---|
| [1] RCV Config | [1] Rx Vol | [1] Call Vol | 0.rx: −28 dB→−32 dB |
| | | | 1.rx: −26 dB→−30 dB |
| | | | 2.rx: −24 dB→−28 dB |
| | | | 3.rx: −20 dB→−24 dB |
| | | | 4.rx: −16 dB→−20 dB |
| | | | 5.rx: −12 dB→−16 dB |
| | | | 6.rx: −8 dB→−12 dB |
| [2] EAR Config | [7] Rx AGC | | [0] agc: 0 |
| | | | [3] st_gain: 11571 |
| | | | [4] e_thres: 2432→3968 |
| | | | [5] e_slope: −128→−144 |
| | | | [6] c_thres: 9600 |

Table 4 is acquired from Tables 1, 2 and 3 in such a way that the values for applying voice call quality, acquired from the database with respect to a corresponding network (for example, network A), are applied to a default value for setting voice call quality, and then a value for determining voice call quality is acquired.

As described in Tables 1 to 4, when the values for applying voice call quality (Table 3) with respect to a corresponding network (network A) are applied (added) to the value for setting a default voice call quality, the value for setting a default voice call quality can be simply changed to a value for determining voice call quality with respect to the corresponding network.

For example, 'A_RCV_Rx_Call_Det=−4' in Table 3 is applied to respective level setting values of 'Call Vol' in the receiver configuration, with respect to the default value for setting voice call quality, and a value for determining voice call quality is thus acquired. When the value for determining voice call quality is applied to the portable terminal while the portable terminal is actually making a call via a corresponding network (network A), the portable terminal using corresponding call medium (receiver, for example) can provide optimal voice call quality.

Under the conditions described above, the network A requires that the volume of the receiver is less than the default value. Therefore, when the parameter, Auto Gain Control (AGC), used for tuning a noise level, and so forth, is adjusted in earphones, white noise can be improved to correspond to a call environment where corresponding call medium is used in the network A.

The values for applying voice call quality with respect to respective networks can be previously stored in a portable terminal as described in Table 3. When the portable terminal is connected to a particular network, the portable terminal can receive a value for applying voice call quality of the network from the network and then store it. The values for determining voice call quality with respect to respective networks serve to determine voice call quality during the call. After terminating the call, the value for determining voice call quality are reset and recovered to the default value for setting voice call quality.

In the following description, a method for improving voice call quality and a portable terminal adapted to the method are explained in detail with reference to drawings.

FIG. 1 illustrates a flow chart describing a method for controlling voice call quality in a portable terminal, according to an embodiment of the present invention.

The portable terminal enters a voice call mode, in response to a user's request, (S101). The portable terminal acquires information regarding a network when it enters the voice call mode (S103). The network information may be acquired when the portable terminal is booted or when the portable terminal enters the voice call mode. The network information can also be acquired when the portable terminal receives a system information message that is periodically broadcast by the network. Further, the network information can be acquired from a SIM card installed in the portable terminal.

The portable terminal can use network information having been previously acquired or network information acquired when it enters a voice call mode. That is, the network information can be adaptively acquired according to system environments. Since the network information acquiring method is not directly related to the present invention, but instead the present invention is related to the use of the acquired network information, the process of acquiring network information will not be explained in the present application.

Next, the portable terminal identifies call media used in the voice call mode (S105). The portable terminal checks whether voice call is performed via a receiver, a speaker, earphones, a Bluetooth® headset, and so forth. Identifying call media is performed by checking external medium connected to an interface of the portable terminal or by determining whether a particular voice call mode, such as a speaker mode, and so forth, is activated.

After that, the portable terminal changes voice call quality of the identified call medium, based on the network information, (S107). If a voice call is performed via call medium, earphones for example, the portable terminal changes the default value for setting voice call quality to a value for determining voice call quality by the value for applying voice call quality corresponding to the network information.

After that, the portable terminal processes voice call quality by reflecting the value for determining voice call quality when a voice call is performed in the network via earphones (S109). Therefore, it can provide optimal voice call quality using earphones.

The portable terminal can maintain the voice call quality until the voice call is terminated. If the voice call is terminated (S111), the portable terminal resets the current value to the default value for setting voice call quality according to setting methods (S113). When the current value is reset to the default value for setting voice call quality, the value for determining the changed voice call quality can be additionally stored or managed together with information regarding the network or earphones, or can be deleted when a voice call is terminated.

FIG. 2 illustrates a flow chart describing a method for, in detail, controlling voice call quality in a portable terminal, according to an embodiment of the present invention, when the voice call quality is changed and the changed voice call quality is applied.

The portable terminal enters a voice call mode in response to a user's request (S201). When entering the voice call mode, the portable terminal acquires information regarding a network and a value for applying voice call quality that is set for the network (S203).

Next, the portable terminal identifies call medium used in the voice call mode (S205). That is, the portable terminal checks whether a voice call is performed via a receiver, a speaker, earphones, a Bluetooth® headset, and the like. After that, the portable terminal checks the setting of items of the call medium (S207), and then changes the default values for setting voice call quality, of respective items, by the values for applying voice call quality, corresponding to the respective items (S209).

For example, if the network is a network A, the portable terminal acquires a value for applying voice call quality of a network A and then changes the voice call quality with respect to the identified call medium in the network. If the call medium is a receiver, the portable terminal enters a mode for setting 'Rx Vol' of the receiver configuration, RCV Config, and allows the value for setting voice call quality, such as 'Call Vol,' 'DTMF Vol,' and so forth, to be changed by the value for applying voice call quality of network A.

Although the present embodiment of the present invention is implemented in such a way as to include the operation for identifying call medium, it should be understood that it can be modified to not include the process. That is, although the embodiment is implemented in such a way to check call medium and then change the setting for the call medium, it should be, however, understood that all default values for setting voice call quality in a portable terminal, with respect to all call media, can be changed by the value for applying the acquired voice call quality. For example, the default values for setting voice call quality, with respect to earphone configuration, EAR Config, speaker configuration, SPK Config, Bluetooth® headset configuration BTH Config, and so forth, as well as the receiver configuration RCV Config at S207, may be all changed.

The objective of the process described above is to provide optimal voice call quality in changed call medium, although a portable terminal user switches from particular call medium to another call medium during the voice call and then makes a call through the other call medium. For example, if a portable terminal user initially makes a call using a receiver and then switches the current receiver mode to a speaker mode, earphone mode, or Bluetooth® head set, and the like, the portable terminal controls the voice call quality to the changed voice call quality according to the value for applying voice call quality, thereby providing the optimal voice call quality in real time.

Next, the portable terminal provides and controls voice call quality, according to a value for setting voice call quality that is changed by corresponding call medium (a value for determining voice call quality) (S211). That is, the portable terminal provides voice call quality according to the value for determining voice call quality and controls a volume according to a user's request based on the value for determining voice call quality when the user adjusts the volume during the call.

When the portable terminal recognizes a call termination (S213), it terminates a voice call mode and then checks a changed setting mode with respect to a changed value for setting voice call quality (S215). The portable terminal checks whether a value for setting voice call quality that is changed by the value for applying voice call quality (a value for determining voice call quality) is stored or maintained or reset to the default value for setting voice call quality (S217).

If a storing mode with respect to the value for determining voice call quality is set at S217, the portable terminal additionally can store and manage the value for setting voice call quality (e.g., a value for determining voice call quality) that is changed with respect to a corresponding network and corresponding call medium (S219). Thereafter, the portable terminal resets and maintains the changed value for setting voice call quality to the default value for setting voice call quality (S221). Conversely, if a storing mode with respect to the value for determining voice call quality is not set at S217, the portable terminal deletes the changed value for setting voice call quality and proceeds with S221.

In the following description, the configuration of the portable terminal according to the present invention is explained.

FIG. 3 illustrates a schematic block diagram for a portable terminal according to an embodiment of the present invention.

The portable terminal 300 includes an RF communication unit 310, an input unit 330, an output unit 350, a memory 370 and a controller 390.

The RF communication unit 310 performs operations related to communication of the portable terminal. The RF communications unit 310 establishes a communication channel to perform communication with a particular network in a preset communication method, such as voice communication, data communication, and the like. In particular, the RF communication unit 310 receives information regarding a network and information regarding voice call quality (e.g., a value for applying voice call quality) of the network via a particular network and outputs them to the controller 390. The RF communications unit 310 can also receive a system information message periodically broadcast by a particular network. The system information message includes network information. In an embodiment of the present invention, the system information message includes information regarding voice call quality of a corresponding network. Therefore, the controller 390 can extract information regarding a network and information regarding voice call quality from the system information message that is received via the RF communication unit 310.

Although the embodiment according to the portable terminal of the present invention is implemented with a single RF communication unit, it should be understood that it can be modified to include as many RF communication units as the number of networks supported by the portable terminal.

The RF communication unit 310 includes an RF transmitter for up-converting the frequency of transmitted signals and amplifying the transmitted signals and an RF receiver for low-noise amplifying received RF signals and down-converting the frequency of the received RF signals.

The input unit 330 includes a module related to input operations of the portable terminal. The input unit 330 also includes a key input unit for receiving a user's input and an input audio processing unit for processing audio signals. The input audio processing unit includes a microphone that receives external audio signals, such as a user's voice signal, and outputs them to the controller 390. The key input unit receives a variety of text information and input signals related to the setting and controlling of a variety of functions and outputs them to the controller 390. The key input unit is implemented by one of a touch pad, a general key array pad, a QWERTY key pad, and input means having function keys to set particular functions, or a combination thereof.

The output unit 350 includes a module related to output operations of the portable terminal. The output unit 350 includes a display unit for displaying a variety of screen data according to the type of the portable terminal and an output audio processing unit for processing audio signals generated from the portable terminal. The output audio processing unit includes a receiver/speaker that outputs audio signals via the controller 390, such as the other portable terminal user's voice signal received via a network and sound signals generated when music files/video files are played back. The receiver and speaker can be integrally or separately formed.

The memory 370 stores at least one application required to perform operations according to the present invention and voice call quality information previously applied to the portable terminal (which is referenced as a value for setting voice call quality). The memory 370 also stores network information by at least one network, and voice call quality information corresponding to the information (which is referenced as a value for applying voice call quality). The memory 370 further stores information regarding variations in voice call quality during the call (which is referenced as a value for determining voice call quality).

Examples of the application are an application that acquires network information when the portable terminal is booted or enters a voice call mode, an application that acquires a value for applying voice call quality with respect to a corresponding network according to acquired network information, an application that changes a default value for setting voice call quality corresponding to a current network by a value for applying voice call quality when the portable terminal makes a call, an application that resets a changed value for setting voice call quality to the default value for setting voice call quality when the voice call mode is terminated, and an application that checks call medium when the portable terminal is making a call. These applications may be stored in an application storing area 377 of the memory 370.

The memory 370 includes at least one or more buffers that temporarily store data generated while the applications are operating. The memory 370 can be installed within the portable terminal and can also be implemented with an external device, such as a smart card. It should be understood that the portable terminal can be implemented to include both internal and external storage media.

The memory 370 is includes a default setting value storing area 371, an applying value storing area 373 and a changed setting value storing area 375. The default setting value storing area 371 store a default value for setting voice call quality, which is originally applied to a portable terminal, described in Tables 1 and 2. The applying value storing area 373 stores values for applying voice call quality by networks, described in Table 3. The changed setting value storing area 375 stores changed values for setting voice call quality (which is called values for determining voice call quality), described in Table 4.

The controller 390 controls the entire operation of the portable terminal and signal flows among blocks in the portable terminal, such as the RF communication unit 310, the input unit 330, the output unit 350, and the memory 370. The controller 390 includes a data processing unit that is composed of a codec and at least one modem for performing communication with a particular network.

In particular, the controller 390 controls a series of operations required to perform functions according to an embodiment of the present invention. This is explained in detail in the following description.

The controller 390 acquires information regarding a network currently connected to the portable terminal and the value for applying voice call quality of the network when the portable terminal is booted or enters a voice call mode. The controller 390 changes the default value for setting voice call quality according to the value for applying voice call quality of a corresponding network when the portable terminal enters a voice call mode. The controller 390 checks call medium according to the call and provides and controls the voice call quality of the call medium by the value for determining voice call quality to which the value for applying voice call quality was reflected. For a simple controlling operation, the controller 390 may include a network managing unit 391, a call medium checking unit 393, a set value managing unit 395, and the like.

The network managing unit 391 acquires information regarding a network connected to the portable terminal when the portable terminal is booted or enters a voice call mode. The network managing unit 391 can extract information regarding a corresponding network from a system information message that is periodically broadcast via the network to which the portable terminal is connected. The network managing unit 391 can also extract information regarding a network from a SIM card installed in the portable terminal, where the SIM card is supported by the network.

The call medium checking unit 393 detects types of call media used when the portable terminal performs communication. The call medium unit 393 determines whether communication is performed by a receiver of the portable terminal, a speaker, earphones, or a Bluetooth® headset. The call medium unit 393 can identify the current call medium by checking external medium, connected to the portable terminal via an interface of the portable terminal, or by checking whether a particular voice call mode, such as a speaker mode, is activated.

The set value managing unit 395 manages a variety of setting values for controlling voice call quality in a portable terminal. The set value managing unit 395 stores and manages a value for setting voice call quality that is initially applied to the portable terminal. The set value managing unit 395 also manages a value for applying voice call quality by networks and a value for determining voice call quality where a value for setting voice call quality is changed by the value for applying voice call quality. The set value managing unit 395 calculates a value for determining voice call quality intended to be applied to a current call mode of the portable terminal. The set value managing unit 395 calculates a value for determining voice call quality by reflecting a value for applying voice call quality of a corresponding network to a value for setting voice call quality in response to a network and call medium, which are used for the current call. The set value managing unit 395 maintains and manages the value for determining voice call quality.

The controller 390 provides and controls voice call quality according to the value for determining voice call quality during the voice call mode. If a network is changed to another network or call medium is changed to another medium, the controller 390 can alter the value for determining voice call quality corresponding to the alteration in the network or in the call medium and then apply it to the portable terminal.

The controller 390 can also control the operations described above and the processes shown in FIGS. 1, 2 and 3. The functions of the controller 390 can also be implemented with software.

It should be understood that the present invention is not limited to the embodiment schematically shown in FIG. 3. For example, the embodiment can be modified to further include an electronic payment module, a digital broadcasting module, a short-range communication module, an Internet module, and at least one interface module to be connected to a variety of call media. In addition, it will be easily appreciated that that the embodiment according to the portable terminal of the present invention can be modified in such a way as to remove a particular block from the present embodiment or to replace it with another block.

For example, the portable terminal, according to the present invention, can include a short-range communication module to support short-range wireless communication, such as Bluetooth® or Zigbee®. The short-range communication module can perform short-range wireless communication with other portable terminals under the control of the controller 390. The portable terminal can also include an Internet module to support communication via the Internet. The Internet module can perform wireless communication with other portable terminals and networks via the Internet under the control of the controller 390. In addition, the portable terminal can include a broadcast receiving module to provide functions related to digital broadcasting.

Although the portable terminal of the present invention is explained based on an embodiment that supports a single mode, it should be understood that the present invention is not limited to the embodiment. For example, the present invention can be also applied to a multi standby portable terminal that supports a combination of at least two networks. That is, the present invention can be applied to a portable terminal that can support a combination of a variety of networks.

In an embodiment of the present invention, voice call quality is described, considering networks and call media that are factors of the call environments. It should be, however, understood that voice call quality can be controlled according to communication connecting methods. In addition, it should also be understood that voice call quality can be controlled by a combination of networks, call media, and communication connecting methods.

As described above, the method and apparatus, according to the present invention, can enhance voice call quality in a portable terminal, corresponding to a variety of call environments, and can optimally maintain it. More specifically, the method and apparatus can adaptively change voice quality, volume, echo, and the like, according to a variety of call environments of a portable terminal and can apply the change to the actual voice call, thereby providing optimal voice call quality according to the call environment.

In addition, the method and apparatus, according to the present invention, can adaptively change voice quality, volume, and the like, corresponding to characteristics, such as call media, communication connection methods, networks, and the like, and can apply it to the portable terminal, while the portable terminal is making a call, so that it can provide optimal voice call quality according to the call environments. Therefore, the method and apparatus is advantageous in that it can resolve users' concerns regarding voice call quality.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling voice call quality in a portable terminal, the method comprising:
    identifying a network connected to the portable terminal and a communication connecting method used when the portable terminal enters a voice call mode;
    identifying a value for applying voice call quality according to the network;
    identifying a call medium used in the voice call mode;
    identifying a value for setting voice call quality based on the call medium used in the voice call mode;
    adding the value for applying voice call quality with respect to the network to the value for setting voice call quality;
    generating a value for determining voice call quality using the value for applying voice call quality and the value for setting voice call quality; and
    controlling the voice call quality of the voice call mode in the network based on the generated value for determining voice call quality.

2. The method of claim 1, further comprising:
    changing the value for setting voice call quality, with respect to at least one call medium used in a voice call mode, using the value for applying voice call quality.

3. The method of claim 2, wherein:
    the value for setting voice call quality is a value that is initially set in the portable terminal to control voice call quality of the portable terminal based on the call medium; and
    the value for applying voice call quality is an applied value to provide an optimal voice call quality by networks supported by the portable terminal.

4. The method of claim 2, wherein:
    the value for applying voice call quality is at least one of previously set in the portable terminal and acquired from at least one of the network, a device connected to the portable terminal, and a SIM card installed in the portable terminal.

5. The method of claim 1, wherein the call medium used in the voice call mode is identified from is at least one of a speaker, earphones, and a Bluetooth™ headset, and the value for setting voice call quality is selected from a table of values including a value for the identified called medium.

6. The method of claim 1, wherein the communication connecting method used in the voice call mode is identified from is at least one of radio frequency communication, wired communication, and internet protocol communication.

7. A method for controlling voice call quality in a portable terminal, the method comprising:
    acquiring network information regarding a network when the portable terminal enters a voice call mode;
    identifying a call medium used in the voice call mode;
    identifying a value for applying voice call quality corresponding to the network information regarding the network and a value for setting voice call quality based on the call medium used in the voice call mode;
    generating a value for determining voice call quality, performed in the voice call mode, using the value for applying voice call quality and the value for setting voice call quality; and
    providing and controlling voice call quality of the voice call mode based on the value for determining voice call quality tuned according to the network information and the call medium.

8. The method of claim 7, further comprising:
    storing and managing the value for determining voice call quality according to a setting method when the voice call mode is terminated; and
    resetting the value for determining voice call quality to a default value for setting voice call quality.

9. The method of claim 7, further comprising:
    changing the value for setting voice call quality, with respect to at least one call medium used in a voice call mode, using the value for applying voice call quality.

10. The method of claim 7, wherein changing a value for setting voice call quality comprises:
    initially setting a value in the portable terminal to control voice call quality of the portable terminal; and
    applying an applied value to voice call quality to provide an optimal voice call quality by networks supported by the portable terminal.

11. The method of claim 7, further comprising at least one of setting at a prior instant and acquiring from at least one network connected to the portable terminal and a SIM card installed in the portable terminal, the value for applying voice call quality in the portable terminal.

12. A portable terminal comprising:
    communication unit configured to establish a communication channel with a particular network in a preset communication method, perform voice communication and data communication, and receive network information and information regarding voice call quality of a network, via the particular network associated with the communication unit;

a memory configured to store at least one application used to perform functions of the portable terminal, voice call quality information previously applied to the portable, the network information of the network and the voice call quality information corresponding to the network information, and voice call quality information changed when the portable terminal makes a call; and a controller configured to acquire network information regarding the network connected to the portable terminal when the portable terminal enters a voice call mode, identify a value for applying voice call quality according to the network information regarding the network, identify a call medium used in the voice call mode, identify a value for setting voice call quality based on the call medium used in the voice call mode, add the value for applying voice call quality with respect to the network to the value for setting voice call quality to generate a value for determining voice call quality, and control the voice call quality of the voice call mode in the network based on the value for determining voice call quality.

13. The portable terminal of claim 12, wherein the memory comprises:
   a default setting value storing area configured to store the default value for setting voice call quality that is initially applied to the portable terminal;
   an applying value storing area configured to store the value for applying voice call quality by networks; and
   a changed setting value storing area configured to store a generated value for determining voice call quality by the value for applying voice call quality and the value for setting voice call quality.

14. The portable terminal of claim 12, wherein the application comprises:
   an application configured to acquire network information when the portable terminal is booted or enters a voice call mode;
   an application configured to acquire the value for applying voice call quality with respect to a corresponding network according to acquired network information;
   an application configured to change a default value for setting voice call quality corresponding to a current network by a value for applying voice call quality when the portable terminal makes a call; and
   an application configured to alter a changed value for setting voice call quality to the default value for setting voice call quality when the voice call mode is terminated.

15. The portable terminal of claim 12, wherein the controller is further configured to check the call medium according to the call and control voice call quality with respect to the call medium.

16. The portable terminal of claim 15, wherein the controller comprises:
   a network managing unit configured to acquire information regarding a network connected to the portable terminal when the portable terminal is one of booted and enters a voice call mode, extract information regarding a corresponding network from a system information message that is periodically broadcast via the network to which the portable terminal is connected, and extract information regarding a certain network from a SIM card installed in the portable terminal, where the SIM card is supported by the certain network;
   a call medium checking unit configured to detect types of call media used when the portable terminal performs communication; and
   a set value managing unit configured to manage the value for setting voice call quality that is initially applied to the portable terminal based on the call media, a value for applying voice call quality by networks, and a value for determining voice call quality where the value for setting voice call quality is changed by the value for applying voice call quality.

17. The portable terminal of claim 16, wherein the set value managing unit is further configured to reflect the value for applying voice call quality with respect to a corresponding network to the value for setting voice call quality, corresponding to a network and call media, which are currently used for the call.

18. The portable terminal of claim 15, wherein the controller is further configured to control the voice call quality of the portable terminal by the value for determining voice call quality during the voice call mode, and change and apply the value for determining voice call quality, corresponding to a change in one of the network and in call medium during the voice call mode.

19. The portable terminal of claim 12, wherein the call medium used in the voice call mode is identified from is at least one of a speaker, earphones, and a Bluetooth™ headset, and the value for setting voice call quality is selected from a table of values including a value for the identified called medium.

20. The method of claim 7, wherein the call medium used in the voice call mode is identified from is at least one of a speaker, earphones, and a Bluetooth™ headset, and the value for setting voice call quality is selected from a table of values including a value for the identified called medium.

* * * * *